Nov. 3, 1964  M. J. E. GOLAY  3,155,828
ALIGNING MEANS AND OPTICAL SYSTEM FOR RADIATION DETECTORS
Filed March 29, 1960  2 Sheets-Sheet 1
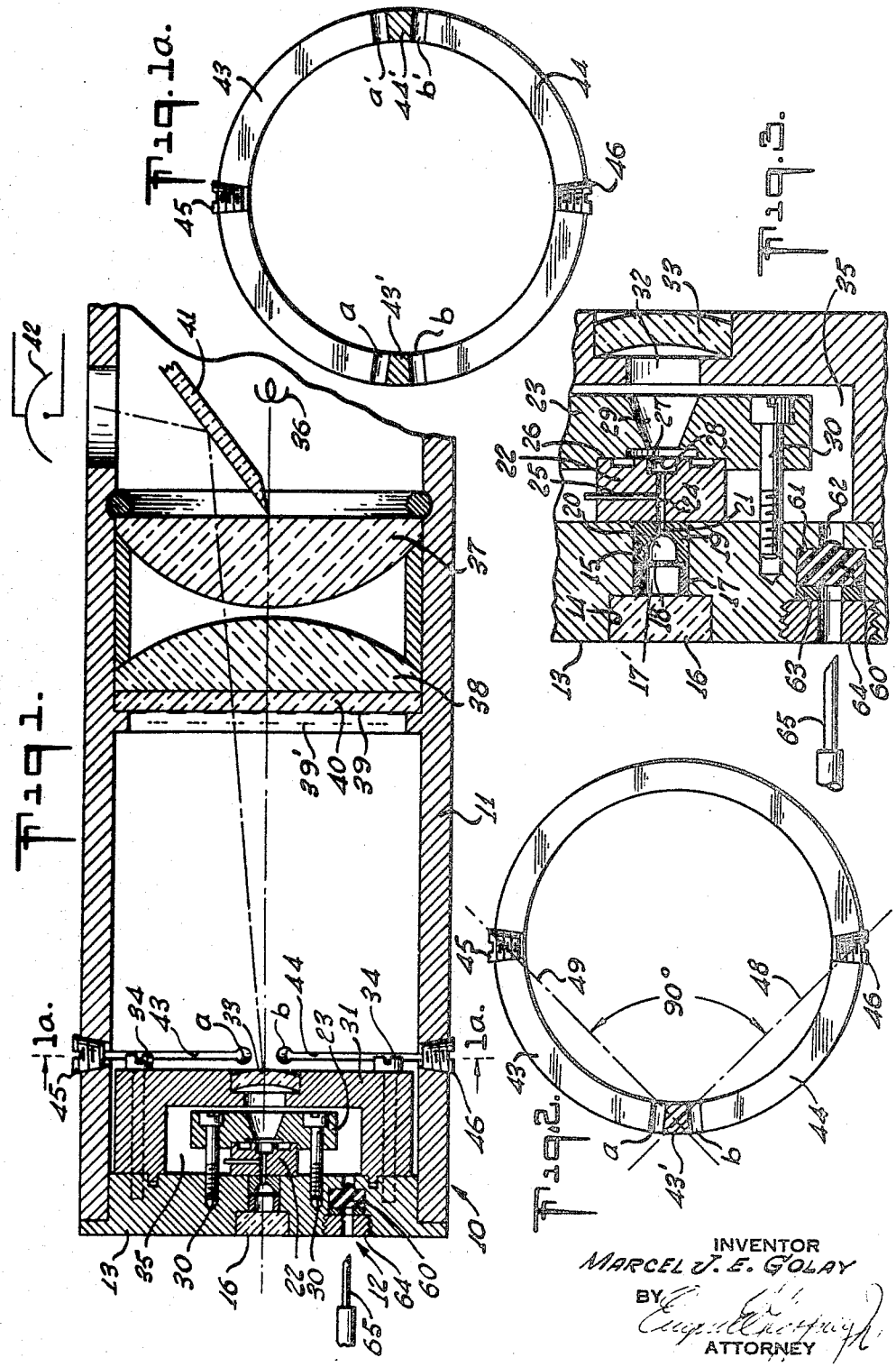
INVENTOR
MARCEL J. E. GOLAY
BY
ATTORNEY

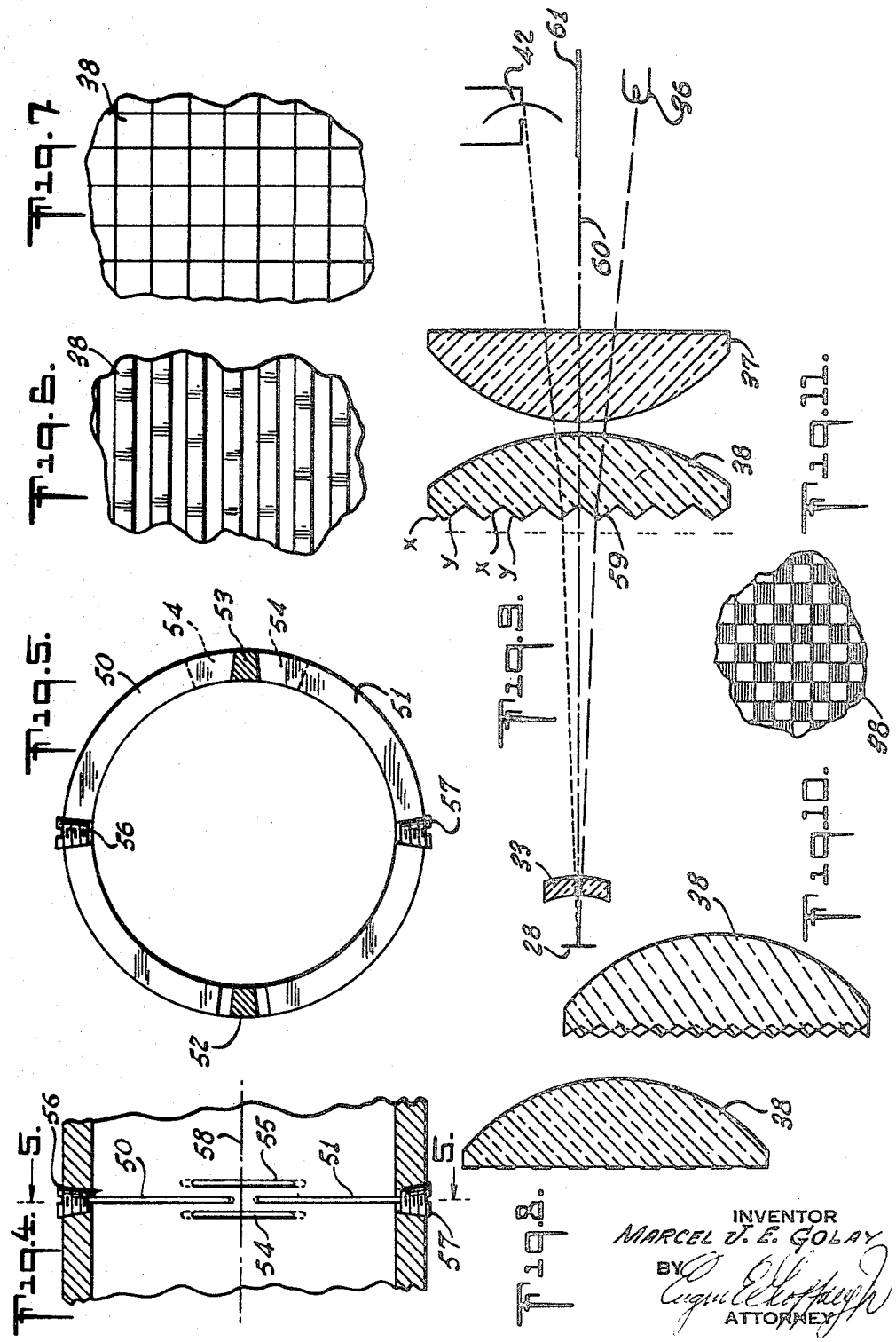

United States Patent Office 3,155,828
Patented Nov. 3, 1964

3,155,828
ALIGNING MEANS AND OPTICAL SYSTEM
FOR RADIATION DETECTORS
Marcel J. E. Golay, 116 Ridge Road, Rumson, N.J.
Filed Mar. 29, 1960, Ser. No. 18,289
14 Claims. (Cl. 250—83.3)

This invention relates to radiation detection and more particularly to improvements of the radiation detecting device illustrated and described in U.S. Patent No. 2,557,096.

The radiation detector in accordance with the above mentioned U.S. patent utilizes a gas chamber in which the gas pressure varies with changes in the intensity of radiation being detected. These pressure changes operate to deflect or distort a diaphragm and the magnitude of the deflection is measured by an optical system.

One object of the invention resides in the provision of an improved radiation detector that will afford a higher sensitivity than the device described in the aforementioned patent.

A further object of this invention is to provide a pneumatic radiation detector which may be more conveniently and more positively adjusted for optimum response than said formerly described device and at the same time maintain its adjustment over longer periods of time and in the presence of more intense shocks and vibrations than said formerly described device.

A still further object is to provide a pneumatic radiation detector which may be exhausted and gas-filled more readily than said formely described device.

A still further object is to provide a pneumatic radiation detector which is of considerably less costly construction than said formerly described device.

These features and advantages will be described with reference to the accompanying drawings in which:

FIG. 1 is a cross sectional view of one embodiment of the invention;

FIG. 1A is a cross sectional view of FIG. 1 taken along the line 1A—1A thereof;

FIG. 2 is a cross sectional view of FIG. 1 similar to FIG. 1A but showing a modified embodiment thereof.

FIG. 3 is a fragmentary portion of FIG. 1 shown in enlarged form;

FIG. 4 is a modified form of the adjusting means shown in FIGS. 1 and 2;

FIG. 5 is a cross sectional view of FIG. 4 taken along the line 5—5 thereof;

FIG. 6 is an elevational view of a fragmentary part of the grid structure shown in FIG. 1;

FIG. 7 is an elevational view of a modified grid structure in accordance with the invention;

FIG. 8 is a modified grid and lens structure for use in the embodiments of the invention shown in FIGS. 1 to 5;

FIG. 9 is a diagrammatic view of a modified optical system in accordance with the invention.

FIG. 10 is a cross sectional view of a modified lens for use with the invention; and FIG. 11 is an elevational view of a fragmentary part of the lens shown in FIG 10.

Referring to the figures and more specifically to FIGS. 1 to 3, the improved radiation detector is generally denoted by the numeral 10 and comprises an elongated barrel or tube 11 which in the instant embodiment has a cylindrical configuration. The left hand end of tube 11 as shown in FIG. 1 contains the radiation sensitive device and is denoted by the numeral 12.

The radiation sensitive device 12 includes a circular plate or disc 13 having connected openings 14 and 15 extending therethrough. The opening 14 contains a window 16 through which the radiant energy being detected may pass. The opening 15 includes a cylindrical spacer 17, an exceedingly thin radiation absorbing film 18 and a second spacing element 19, the latter having a gas chamber 20 formed therein and a capillary passage 21 extending from the chamber 20.

The right hand face of the plate 13 carries a pair of circular elements 22 and 23. Element 22 has an axial passage 24 aligned and in communication with the passage 21 and a second radial passage 25 intersecting the passage 24. The outer face 26 of element 22 has a chamber 27 formed therein and in communication with the passage 24. The chamber 27 is sealed by a variable focus mirror 28. The element 23 has a conical opening 29 aligned with the mirror 28 and is attached to the plate 13 by screws 30. The elements 22 and 23 are enclosed by an outer housing 31 sealed to the plate 13 and having a central opening 32 which includes a meniscus lens 33. The housing 31 is secured to the plate 13 by screws 34 and forms a pressure equalizing chamber 35.

In operation the chambers 20, 27 and 35 are filled with gas and are interconnected by passages 21, 24, 25 and opening 29 so that the average gas pressure on the surfaces of the mirror 28 will be equalized. The chamber 17′ in the element 17 also contains a suitable gas. Radiation to be detected passes through the window 16 and heats the gas in chamber 17′ causing it to expand. This action deflects the film 18 and in turn distends the flexible mirror 28 which together with the meniscus lens forms a variable focus mirror.

The optical system for measuring movement of the mirror 28, includes a light source 36, condensing lenses 37 and 38 carried by tube 11, a line grid 39 carried by plate 40, a mirror 41 and a photocell 42.

The light from a source 36 is condensed on mirror 28 by means of lenses 37 and 38. The line grid pattern 39, ruled on glass plate 40, and consisting of opaque lines separated by clear lines of the same width, forms part of the optical system and is cemented to lens 38 to form a single optical element with no appreciable reflection of light occurring at the interfaces. In this way four reflections, which would occur when separate elements are used, are substantially eliminated during the travel of light from source 36 to flexible mirror 28 and back to photocell 42, after being deflected by mirror 41 which blocks one-half of the optical path between source 36 and lens 37. The substantial elimination of said four reflections permits the realization of a 20% to 25% increase in useful light signal. Furthermore, a cost reduction is achieved as fewer mechanical elements are required to mount the optical elements. Alternately, grid 39 may be ruled or otherwise formed directly on lens 38 as shown in FIG. 8. In either case, line grid 39 will form, optically, an integral part of the left most element of the condensing system.

The distance between grid 39 and meniscus lens 33 is calculated in connection with the design of mounting cylinder 11 so that, when flexible mirror 28 is in the flat state, the image 39′ of grid 39 is formed at a short distance from grid 39, either at the left, as illustrated, or at the right of grid 39. Image 39′ should be so adjusted vertically that the image of the clear portions of grid 39 are slightly out of focus on the opaque portions. With such an adjustment, some light will pass through to photocell 42 when mirror 28 is flat, but as variations of radiation cause flexible mirror 28 to be distended to the right or to the left, image 39′ will also be displaced to the right or to the left, thereby causing the total light flux reaching light detector 42 to decrease or to increase.

An improved structure for adjustment of image 39′ in a vertical plane are as follows: Cylinder 11 is cut to form two slots denoted by the numerals 43 and 44 and terminating in drilled holes $a$, $a'$ and $b$, $b'$ (FIGS. 1 and 1A). Each slot is less than 180° in angular width leaving diametrically opposite unslotted tube portions 43' and 44'. The holes 43' and 44' serve to avoid sharp corners where unduly high strains may be produced. Thus, the portion of cylinder 11 to the left of slots 43 and 44 can be slightly and elastically tilted above and below a horizontal plane relative to the remainder of the cylinder 11 to the right of said slots.

The foregoing adjustment may be accomplished by one or two tapered screws 45 and 46 engaging cooperating openings intersecting the slots. It has been found that with the design as described above a smooth and highly reproducible vertical adjustment of the image 39' can be achieved, and that this adjustment has negligible backlash and is very stable under all practical conditions of use.

Line grid pattern 39 may be replaced by a checkerboard pattern of opaque and clear square portions which is etched or otherwise formed on plate 40, or directly on lens 38, and a higher modulation of the light reaching light detector 42 and hence a higher sensitivity are achieved in this manner (see FIG. 7). This is attained because the curvature of flexible mirror 28 in both the meridian and the sagittal planes is thus utilized. When the checkerboard pattern is utilized, it becomes necessary to provide a two dimensional adjustment of the image 39' of checkerboard pattern.

The two dimensional adjustment of the checkerboard is realized by cutting cylinder 11 in its entire periphery, with the exception of the area 43' as illustrated by FIG. 2. Two drilled holes $a$ and $b$ serve as before to eliminate sharp corners where stresses may be high. Two adjusting tapered screws 45 and 46 provide the two-dimensional adjustment required, as turning 45 produces an adjustment about axis 48, while turning 46 produces an adjustment about axis 49, which is orthogonal to axis 48.

Alternately, the adjusting arrangement illustrated in FIGS. 4 and 5 may be utilized, in which two diametrically opposite slots 50 and 51 are cut so as to leave two uncut portions 52 and 53 in barrel 11. One additional smaller slot 54, or two additional smaller slots 54 and 55 permit the two portions of barrel 11 to become more or less separated in the neighborhood of uncut portion 53 when tapered screws 56 or 57 are turned, so that the desired two dimensional adjustment between said two barrel portions can be thus effected, while there is less tendency for said two portions to pivot with respect to each other about axis 58.

FIG. 9 illustrates an alternate optical system in which the line grid pattern of alternately opaque and clear portions has been replaced by a line grid pattern of clear elongated portions or prisms 59 which have two alternating orientations. These two groups of surfaces have been designated by "$a$" and "$b$" respectively. Light source 36 is positioned below central optical axis 60 so that the image of light source 36 formed by the "$b$" group falls on flexible mirror 28 while the image formed by the "$a$" group is substantially absorbed by blackened portions of the inner walls of the radiation detector. Thus, as seen from flexible mirror 28, the "$b$" group forms luminous lines while the "$a$" group forms dark lines. The optical system is so adjusted that when flexible mirror 28 is flat, these dark lines are imaged on themselves, but slightly out of focus, in an "$a$" group, and some light reaches light detector 42. As variations of radiation cause flexible mirror 28 to be distended to the right or left, the "$a$" image moves to the right or left of the position indicated in FIG. 9, thereby causing the total light flux reaching light detector 42 to decrease or to increase. Inasmuch as mirror 41 has been eliminated, the amounts of light reaching flexible mirror 28 and the amount of modulated light reaching light detector 42 are respectively doubled, and a two-fold increase in radiation detector sensitivity is thus achieved, with respect to the sensitivity of the system illustrated by FIG. 1. A shield 61 serves to protect light detector 42 from direct illumination by source 36.

FIGS. 10 and 11 illustrate a condensing lens 38 with a checkerboard pattern of square portions forming one group "$x$" with a common orientation, and another group "$y$" with a common orientation different from that of group "$x$." When the lens illustrated by FIGS. 10 and 11 is substituted for the one shown in FIG. 9, a two dimensional adjustment of the image of the "$x$" group on itself is required, but since this arrangement utilizes the curvature of flexible mirror 28 in both the meridian and sagittal planes, an approximately two-fold increase of the amount of modulated light reaching light detector 14 is achieved thereby.

This invention further provides a novel and improved procedure for introducing gas into the chamber 35 and chambers 20, 27, and 29 communicating therewith. This structure is shown in FIGS. 1 and 3 and includes a self-sealing member 60 of rubber or other suitable material disposed within a recess 61 formed in the detector plate 13. The recess 61 is connected with the chamber 35 by means of a narrow passage 62. The self-sealing member 60 is held in position within the opening 61 with a space washer 63 and a screw threaded member 64 which engages a cooperating threaded opening in the plate 13. By tightening the threaded member 64 the self-sealing resilient member 60 is placed under some compression to insure the maintenance of a proper seal after it has been punctured by a tubular needle 65. To charge the chamber 35 with gas, the needle 65 is merely inserted into the opening within the threaded member 64 and extended on through the self-sealing member 60. After proper gas pressure has been applied to the gas chamber 35, the needle 65 is withdrawn and the member 60 completely seals the unit.

While only certain embodiments of the invention have been shown and described, it is apparent that modifications alterations and changes may be made without departing from the true scope and spirit thereof.

What is claimed is:

1. In a pneumatic radiation detector having a flexible mirror movable in response to changes in radiation comprising a source of light, at least one condensing lens between the source and mirror, a meniscus lens between the condensing lens and mirror, the light from said source being directed through said lenses onto said mirror and reflected by said mirror back through said lenses, a light detector, means for directing at least part of said reflected light onto said light detector and light control pattern in said light path forming an integral part of said condensing lens and effectively imaged substantially upon itself by said mirror whereby the quantity of light reaching said light detector will be modified by movement of said mirror.

2. In a pneumatic radiation detector having a flexible mirror movable in response to changes in radiation comprising a source of light, at least one condensing lens between the source and mirror, the light from said source being directed through said lenses onto said mirror and reflected by said mirror back through said lenses, a light detector, means for directing at least part of said reflected light onto said light detector and light control means in said light path and effectively imaged substantially upon itself by said mirror whereby the quantity of light reaching said light detector will be modified by movement of said mirror, said light control pattern comprising a plurality of prismatic elements.

3. In a pneumatic radiation detector having a flexible mirror movable in response to changes in radiation according to claim 1 wherein said light control pattern includes opaque and transparent areas.

4. In a pneumatic radiation detector having a deflecting mirror, an optical system comprising a source of light, at least one condensing lens between said source and mirror, a meniscus lens between said condensing lens and mirror, the light from said source being directed through said lenses onto said mirror and reflected by said mirror back through said lenses, a light detector, means for directing at least part of said reflected light onto said light detector, and a pattern having opaque and transparent portions interposed in said light path, said lenses and mirror being adjusted to focus an image of said pattern in the vicinity of the pattern itself whereby deflection of the mirror will shift the image relative to the pattern and modify the light transmitted to said light detector and wherein said pattern is in checkerboard form with alternating opaque and transparent areas.

5. In a pneumatic detector according to claim 4 wherein said pattern is formed on said condensing lens.

6. In a pneumatic radiation detector having a flexible mirror movable in response to changes in radiation comprising a source of light, at least one condensing lens between the source and mirror, a meniscus lens between the condensing lens and mirror, the light from said source being directed through said lenses onto said mirror and reflected by said mirror back through said lenses, a light detector, means for directing at least part of said reflected light onto said light detector and light control means in said light path and effectively imaged substantially upon itself by said mirror whereby the quantity of light reaching said light detector will be modified by movement of said mirror, said light control means comprising a series of surfaces formed on said condensing lens with adjoining surfaces having reverse slopes.

7. In a pneumatic radiation detector having a flexible mirror movable in response to changes in radiation comprising a source of light, at least one condensing lens between the source and mirror, a meniscus lens between the condensing lens and mirror, the light from said source being directed through said lenses onto said mirror and reflected by said mirror back through said lenses, a light detector, means for directing at least part of said reflected light onto said light detector and light control means in said light path and effectively imaged substantially upon itself by said mirror whereby the quantity of light reaching said light detector will be modified by movement of said mirror, said light control means comprising a plurality of series of surfaces formed on said condensing lens with adjoining surfaces having reverse slopes, and the surface slopes of each series being reversed relative to the surface slopes of adjoining series to form effectively a checkerboard pattern.

8. A radiation detector comprising an elongated tube, a radiation detector including a flexible mirror carried by said tube, said mirror being deflectable in response to changes in radiation falling on said radiation detector, an optical system carried by said tube for detecting movement of said mirror, said tube including at least one slot in the tube wall between said detector and optical system and means cooperating with said slot for effecting angular adjustment of the axis of the tube portions on each side of said slot to adjust the alignment of said mirror and said optical system.

9. A radiation detector according to claim 8 wherein said optical system includes a source of light, at least one condensing lens between the source and mirror, a meniscus lens between the condensing lens and mirror, the light from said source being directed through said lenses onto said mirror and reflected by said mirror back through said lenses, a light detector means for directing at least part of said reflected light onto said light detector and light control means on said condensing lens and effectively imaged substantially upon itself by said mirror whereby the quantity of light reaching said light detector will be modified by movement of said mirror.

10. A radiation detector according to claim 8 wherein said tube includes two slots each having an angular width of less than 180° and disposed symmetrically with respect to the axis of the tube, at least one of said slots having an enlarged tapered threaded portion between its ends, and a tapered screw engaging said opening.

11. A radiation detector according to claim 8 wherein said slot terminates in stress relieving openings formed in said tube.

12. A radiation detector according to claim 8 wherein said slot has an angular width of less than 360° with an uncut tube portion between the ends of the slot, and diametrically disposed tapered means engaging said slot at points equidistant from said uncut portion whereby said tapered means will effect angular adjustment of said axis in two orthogonal directions.

13. A radiation detector comprising an elongated tube, a radiation detector including a flexible mirror carried by said tube, said mirror being deflectable in response to changes in radiation falling on said radiation detector, an optical system carried by said tube for detecting movement of said mirror, said tube including two slots each having an angular width of less than 180° and disposed symmetrically with respect to the axis fo the tube, at least one of said slots having an enlarged tapered threaded portion between its ends, and a tapered screw engaging said opening, said tube further including at least one additional slot spaced from and aligned with adjoining ends of the first said two slots.

14. In a pneumatic radiation detector having a flexible mirror movable in response to changes in radiation comprising a source of light, at least one condensing lens between the source and mirror, a meniscus lens between the condensing lens and mirror, the light from said source being directed through said lenses onto said mirror and reflected by said mirror back through said lenses, a light detector, means for directing at least part of said reflected light onto said light detector and light control means in said light path and effectively imaged substantially upon itself by said mirror whereby the quantity of light reaching said light detector will be modified by movement of said mirror, said radiation detector further including a gas chamber with said mirror forming a wall thereof, means for modifying the pressure of said gas in said chamber in response to changes in radiation being detected and in turn effect deflection of said mirror, and means for introducing gas into and removing gas from said chamber to adjust the pressure therein comprising a plug of self-sealing material disposed within an opening formed in a wall of said chamber and means for at least slightly compressing said material whereby a tubular needle may be moved through said material to communicate with said chamber and said material upon removal of the needle sealing said chamber.

References Cited in the file of this patent

UNITED STATES PATENTS

| | | |
|---|---|---|
| 2,557,096 | Golay | June 19, 1951 |
| 2,562,864 | Jury | July 31, 1951 |
| 2,613,327 | Beckman et al. | Oct. 7, 1952 |
| 2,693,418 | Smith | Nov. 2, 1954 |
| 2,742,578 | Nicolson | Apr. 17, 1956 |